United States Patent
Williams (10) Patent No.: US 8,498,783 B2
(45) Date of Patent: Jul. 30, 2013

(54) METHOD OF CONTROLLING A VEHICLE STEERING APPARATUS

(75) Inventor: Daniel E. Williams, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 68 days.

(21) Appl. No.: 13/192,556

(22) Filed: Jul. 28, 2011

(65) Prior Publication Data

US 2013/0030655 A1    Jan. 31, 2013

(51) Int. Cl.
*A01B 69/00*    (2006.01)

(52) U.S. Cl.
USPC .......................................................... 701/42

(58) Field of Classification Search
USPC .......................................................... 701/42
See application file for complete search history.

(56) References Cited

U.S. PATENT DOCUMENTS

| | | | |
|---|---|---|---|
| 5,668,722 A | 9/1997 | Kaufmann et al. | |
| 6,152,254 A | 11/2000 | Phillips | |
| 6,490,514 B2 | 12/2002 | Kurishige et al. | |
| 6,546,322 B2 | 4/2003 | Williams | |
| 6,983,818 B2 | 1/2006 | Fujioka et al. | |
| 7,860,624 B2 * | 12/2010 | Kubota et al. | 701/41 |
| 2004/0019417 A1 | 1/2004 | Yasui et al. | |
| 2008/0208411 A1 * | 8/2008 | Broecker | 701/42 |
| 2010/0004824 A1 * | 1/2010 | Ikeda et al. | 701/42 |
| 2010/0070136 A1 | 3/2010 | Williams et al. | |
| 2010/0198461 A1 | 8/2010 | Burton et al. | |
| 2011/0098890 A1 * | 4/2011 | Lee et al. | 701/42 |
| 2011/0153162 A1 * | 6/2011 | Kezobo et al. | 701/42 |

* cited by examiner

*Primary Examiner* — James Trammell
*Assistant Examiner* — Michael D Lang
(74) *Attorney, Agent, or Firm* — Tarolli, Sundheim, Covell & Tummino LLP (57) ABSTRACT

A method for controlling a steering apparatus (10) of a vehicle produces an error signal (128) by subtracting a hand wheel torque (118) and a column torque (126) from a desired operator torque (112) to be applied to a hand wheel (14) of the vehicle. A controller (102) receives at least one vehicle condition signal (106, 108, 110) and determines the desired operator torque (112). The desired operator torque (112) is filtered into a low frequency torque component (112*a*) and a high frequency torque component (112*b*). The steering apparatus (10) is controlled based on the low frequency torque component (112*a*) and the high frequency torque component (112*b*).

21 Claims, 4 Drawing Sheets

METHOD OF CONTROLLING A VEHICLE STEERING APPARATUS

TECHNICAL FIELD

The present invention relates to a method of controlling a power assisted steering apparatus for a vehicle.

BACKGROUND OF THE INVENTION

Various methods are known for controlling a power assisted steering apparatus for a vehicle. One known method is described in U.S. Pat. No. 6,546,322. Vehicle condition signals are analysed during a steering maneuver to determine a steering torque command. The steering torque command represents the desired steering effort by the operator of the vehicle during the steering maneuver. A torque sensor measures a column torque actually applied by the operator. The torque required to overcome the inertia of the hand wheel is calculated. This torque is felt by the operator and affects the overall steering effort exerted by the operator. The steering apparatus is controlled while accounting for the torque necessary to overcome hand wheel inertia. The column torque is preferably determined by measuring the torque across a torsion bar. The column torque is compared to the steering torque demand to produce an error signal. The error signal is used to control an electric power assisted steering apparatus.

SUMMARY OF THE INVENTION

The present invention is directed to a method for controlling a steering apparatus of a vehicle. At least one signal indicative of a condition of the vehicle during a steering maneuver is provided to a controller. The vehicle condition signal is analyzed to determine a desired operator torque to be applied to a hand wheel of the vehicle. The desired operator torque is filtered into a low frequency torque component and a high frequency torque component. The steering apparatus is controlled based on the low frequency torque component and the high frequency torque component.

In another aspect of the present invention, a method for controlling a steering apparatus of a vehicle includes providing at least one signal indicative of a condition of the vehicle during a steering maneuver to a controller. The vehicle condition signal is analyzed to determine a desired operator torque to be applied to a hand wheel of the vehicle. The desired operator torque is filtered into a low frequency torque component and a high frequency torque component. Inertia of the hand wheel of the vehicle is determined and an acceleration of the hand wheel is determined. A hand wheel torque is calculated by multiplying the inertia of the hand wheel with the acceleration of the hand wheel. A column torque across a torsion bar is determined. An error signal is produced by subtracting the hand wheel torque and the column torque from the low frequency torque component. A first electric power output is produced based on the error signal and a second electric power output is produced based on the high frequency torque component. The steering apparatus is controlled with the first electric power output and the second electric power output

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
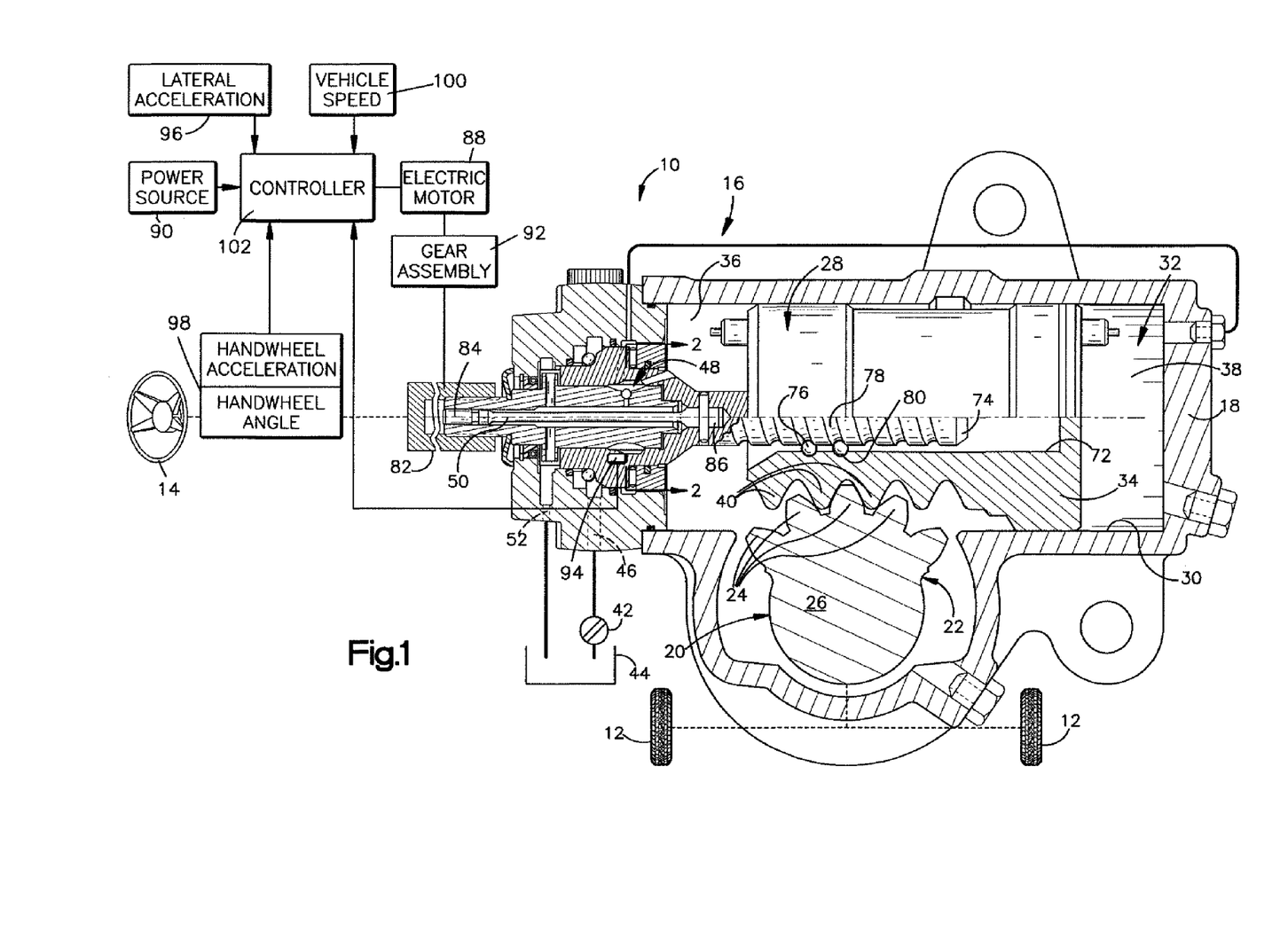
FIG. 1 is a schematic illustration of an apparatus used to perform the method of the present invention.

FIG. 1 illustrates an apparatus 10 used to perform the method of the present invention. The apparatus 10 is a vehicle power steering system for turning steerable wheels 12 of a vehicle (not shown) in response to rotation of a hand wheel 14 of the vehicle.

The apparatus 10 includes a hydraulic powered steering gear 16. The steering gear 16 includes a housing 18 and a drive mechanism 20. The drive mechanism 20 is moved in response to rotation of the hand wheel 14 of the vehicle. The motion of the drive mechanism 20 results in a turning of the steerable wheels 12 of the vehicle.

The drive mechanism 20 includes a sector gear 22 having a plurality of teeth 24. The sector gear 22 is fixed on an output shaft 26 that extends outwardly through an opening in the housing 18. The output shaft 26 is typically connected to a pitman arm that is connected to the steering linkage of the vehicle. The dashed lines in FIG. 1 represent the pitman arm and steering linkage. Thus, as the sector gear 22 rotates, the output shaft 26 is rotated to operate the steering linkage. As a result, the steerable wheels 12 of the vehicle are turned.

The steering gear 16 further includes a hydraulic motor 28 for moving the drive mechanism 20. The hydraulic motor 28 is located within the housing 18 of the steering gear 16. The housing 18 of the steering gear 16 has an inner cylindrical surface 30 defining a chamber 32. A piston 34 is located within the chamber 32 and divides the chamber 32 into opposite chamber portions 36 and 38. One chamber portion 36 is located on a first side of the piston 34 and the other chamber portion 38 is located on a second side of the piston 34. The piston 34 creates a seal between the respective chamber portions 36 and 38 and is capable of axial movement within the chamber 32. This axial movement of the piston 34 results in an increase in volume of one chamber portion 36 or 38 and a corresponding decrease in volume of the other chamber portion 36 or 38.

A series of rack teeth 40 is formed on the periphery of the piston 34. The rack teeth 40 act as an output for the hydraulic motor 28 and mesh with the teeth 24 formed on the sector gear 22 of the drive mechanism 20.

A pump 42 pumps hydraulic fluid from a reservoir 44 to the hydraulic motor 28. The engine of the vehicle drives the pump 42. However, the pump 42 could be driven otherwise, such as by an electric motor. The pump 42 forces hydraulic fluid into an inlet 46 of the housing 18. The inlet 46 directs the flow of the fluid to a directional control valve 48.

The directional control valve 48 directs the fluid to an appropriate chamber portion 36 or 38 of the hydraulic motor 28. The flow of hydraulic fluid toward one of the chamber portions 36 or 38 increases the pressure within that chamber portion 36 or 38. When the pressure of one chamber portion 36 or 38 increases relative to the pressure of the other chamber portion 36 or 38, the piston 34 moves axially and the volume of the higher-pressure chamber portion 36 or 38 increases. The volume of the higher-pressure chamber portion 36 or 38 increases until the pressure within each chamber portion 36 and 38 equalizes. As the volume of one chamber portion 36 or 38 increases, the volume of the other chamber portion 36 or 38 decreases. The decreasing chamber portion 36 or 38 is vented to allow a portion of the fluid contained in the decreasing chamber portion 36 or 38 to escape. The escaping fluid exits the housing 18 via a return 52 and is directed into the reservoir 44.

Figure 2:
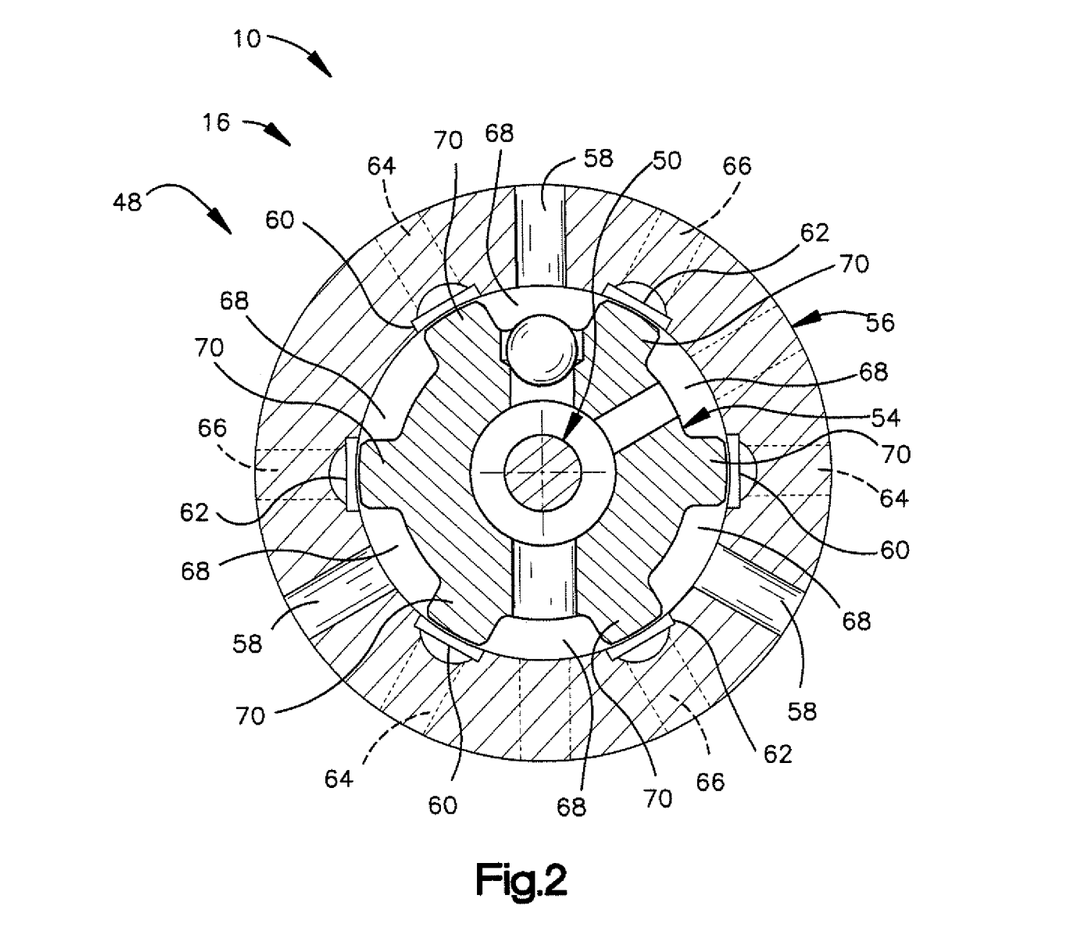
FIG. 2 is a view along line 2-2 of FIG. 1.

An embodiment of the directional control valve 48 is shown in FIG. 2. The directional control valve 48 contains a valve core part 54 and a valve sleeve part 56. A portion of the valve core part 54 is contained within and is rotatable relative to the valve sleeve part 56.

The valve sleeve part 56 includes three radially directed passages 58 that extend from an outer circumference of the valve sleeve part 56 to an inner circumference of the valve sleeve part 56. Each of these radial passages 58 is supplied with hydraulic fluid that enters the housing 18 through the inlet 46. Two axially extending grooves 60 and 62 are associated with each radial passage 58. The axially extending grooves 60 and 62 are located on the inner circumference of the valve sleeve part 56. As shown in FIG. 2, one groove 62 is located clockwise from and one groove 60 is located counter-clockwise from each radial passage 58. The grooves 60 and 62 are spaced an equal distance from the respective radial passage 58. Each groove 60 leads to a passage 64 extending radially outwardly through the valve sleeve part 56. Each groove 62 leads to a passage 66 extending radially outwardly through the valve sleeve part 56. Each groove 60 and 62 and associated passage 64 and 66 is associated with a particular chamber portion 36 and 38 of the hydraulic motor 28. For example, with reference to FIG. 2, each groove 62 and associated passage 66 located immediately clockwise of a radial passage 58 will supply hydraulic fluid to chamber portion 36; whereas, each groove 60 and associated passage 64 located immediately counter-clockwise from a radial passage 58 will supply hydraulic fluid to chamber portion 38.

Six grooves 68 are located around the outer circumference of the valve core part 54. The valve core part 54 also includes six protrusions 70. A protrusion 70 separates adjacent grooves 68 on the outer circumference of the valve core part 54. Side walls of the protrusion 70 form side walls of the grooves 68.

When the valve core part 54 is located relative to the valve sleeve part 56 such that each protrusion 70 of the valve core part 54 is centered relative to a respective passage 64 and 66 of the valve sleeve part 56, the directional control valve 48 is in a neutral position. FIG. 2 illustrates the directional control valve 48 in the neutral position. In this neutral position, the pressure within each chamber portion 36 and 38 of the hydraulic motor 28 is the same so that the piston 34 is stationary. When the valve core part 54 is rotated relative to the valve sleeve part 56, access to one of the two associated grooves 60 and 62 of the valve sleeve part 56 is restricted by a protrusion 70, while access to the other of the two associated grooves 60 and 62 is increased. This allows a greater amount of the hydraulic fluid to flow into the open groove 60 and 62, resulting in a pressurizing of the respective chamber portion 36 or 38 associated with that groove 60 or 62. As a result, the piston 34 of the hydraulic motor 28 is moved causing an increase in the volume of the respective chamber portion 36 or 38. For example, if the valve core part 54 is rotated clockwise, the groove 60 of the valve sleeve part 56 located on the counter-clockwise side of the radial passage 58 becomes blocked and the groove 62 located on the clockwise side of the radial passage 58 becomes open. Thus, a greater amount of the hydraulic fluid flows into the open groove 62 and travels to the chamber portion 36 of the hydraulic motor 28 associated with the open groove 62. The increased hydraulic fluid flowing to chamber portion 36 increases the pressure within chamber portion 36 and forces the piston 34 to move in an axial direction to increase the volume of chamber portion 36. As a result, the piston 34 rotates the sector gear 22 and the steerable wheels 12 are turned in the appropriate direction.

The piston 34 of the hydraulic motor 28 contains a bore 72, partially shown in FIG. 1, which is open toward the directional control valve 48. The valve sleeve part 56 and a follow-up member 74 form an integral one-piece unit that is supported for rotation relative to the piston 34 by a plurality of balls 76. The outer periphery 78 of the follow-up member 74 is threaded. The plurality of balls 76 interconnects the threaded outer periphery 78 of the follow-up member 74 with an internal thread 80 formed in the bore 72 of the piston 34. As a result of the interconnecting plurality of balls 76, axial movement of the piston 34 causes the follow-up member 74 and the valve sleeve part 56 to rotate. The rotation of the follow-up member 74 and the valve sleeve part 56 returns the directional control valve 48 to the neutral position.

The valve core part 54 of the directional control valve 54 is fixedly connected to an input shaft 82 (FIG. 1). As shown schematically by dashed lines in FIG. 1, the input shaft 82 is fixedly connected to the hand wheel 14 of the vehicle. Rotation of the hand wheel 14 results in rotation of the input shaft 82 and rotation of the valve core part 54.

The torsion bar 50 has a first end 84 and a second end 86. The first end 84 of the torsion bar 50 is fixed relative to the input shaft 82 and the valve core part 54. The second end 86 of the torsion bar 50 is fixed relative to the valve sleeve part 56 and the follow-up member 74. At least a portion of the torsion bar 50 extends through an axially extending bore 72 in the valve core part 54, as shown in FIGS. 1 and 2.

When the resistance to turning of the steerable wheels 12 of the vehicle is below a predetermined level, rotation of the hand wheel 14 is transferred through the torsion bar 50 and causes rotation of the follow-up member 74. As a result, the directional control valve 48 remains in the neutral position. Rotation of the follow-up member 74 causes movement of the piston 34 and results in turning of the steerable wheels 12. When resistance to turning the steerable wheels 12 of the vehicle is at or above the predetermined level, rotation of the follow-up member 74 is resisted. As a result, rotation of the hand wheel 14 rotates the first end 84 of the torsion bar 50 relative to the second end 86 of the torsion bar 50. The rotation of the first end 84 of the torsion bar 50 relative to the second end 86 of the torsion bar 50 applies a torque across the torsion bar 50 and causes the valve core part 54 to rotate relative to the valve sleeve part 56.

As discussed above, when the valve core part 54 rotates relative to the valve sleeve part 56, hydraulic fluid is directed toward one of the chamber portions 36 or 38. As a result, the piston 34 moves within the chamber 32. Movement of the piston 34 results in turning of the steerable wheels 12 of the vehicle, as well as, rotation of the follow-up member 74.

As discussed above, rotation of the follow-up member 74 rotates the valve sleeve part 56 until the directional control valve 48 is again in the neutral position. When the directional control valve 48 is in the neutral position, the torque across the torsion bar 50 is removed and the first end 84 of the torsion bar 50 is no longer rotated relative to the second end 86 of the torsion bar 50.

The apparatus 10 also includes an electric motor 88. The electric motor 88 may be of any conventional design. The electric motor 88 receives electric power from a power source 90, preferably the vehicle battery. An output shaft (not shown) of the electric motor 88 is connected to the input shaft 82. Preferably, a gear assembly 92 is used to connect the output shaft of the electric motor 88 to the input shaft 82. When the electric motor 88 receives electric power, the output shaft of the electric motor 88 rotates the input shaft 82. Thus, the electric motor 88 is said to be "in series connection" with the hydraulic motor 28.

The apparatus 10 also includes a torque sensor 94 for sensing column torque and outputting a signal indicative of the column torque. Column torque is the torque across the torsion bar 50. The torque sensor may measure the rotational movement of the first end 84 of the torsion bar 50 relative to the second end 86 of the torsion bar 50. The movement of the valve core part 54 relative to the valve sleeve part 56 will also indicate the relative rotation between the first end 84 and the second end 86 of the torsion bar 50. The column torque can be determined using the material properties of the torsion bar 50 and the relative rotation across the torsion bar 50.

As shown in FIG. 1, the apparatus 10 also includes a plurality of vehicle condition sensors 96, 98, and 100 and a controller 102. Preferably, the vehicle condition sensors include a lateral acceleration sensor 96, a hand wheel rotation sensor 98, and a vehicle speed sensor 100. Each sensor 96, 98, and 100 is electrically connected to the controller 102.

The lateral acceleration sensor 96 continuously senses the lateral acceleration of the vehicle and generates an electrical signal indicative of the sensed lateral acceleration. The hand wheel rotation sensor 98 continuously senses the magnitude, rate, and acceleration of rotation of the vehicle hand wheel 14 and generates electrical signals indicative of these parameters. The hand wheel rotation magnitude is the angle of rotation of the hand wheel 14 relative to a straight ahead position of the hand wheel 14. Rotation of the hand wheel 14 in a first direction may be designated as a positive value and rotation of the hand wheel 14 in a second direction, opposite the first direction, may be designated as a negative value. The hand wheel rotation sensor 98, or the controller 102, may determine the rate of rotation of the hand wheel 14 by taking a time differential of the magnitude and may determine the hand wheel acceleration by taking a time differential of the rate of rotation. The vehicle speed sensor 100 continuously senses the vehicle speed and generates an electrical signal indicative of the speed.

Figure 3:
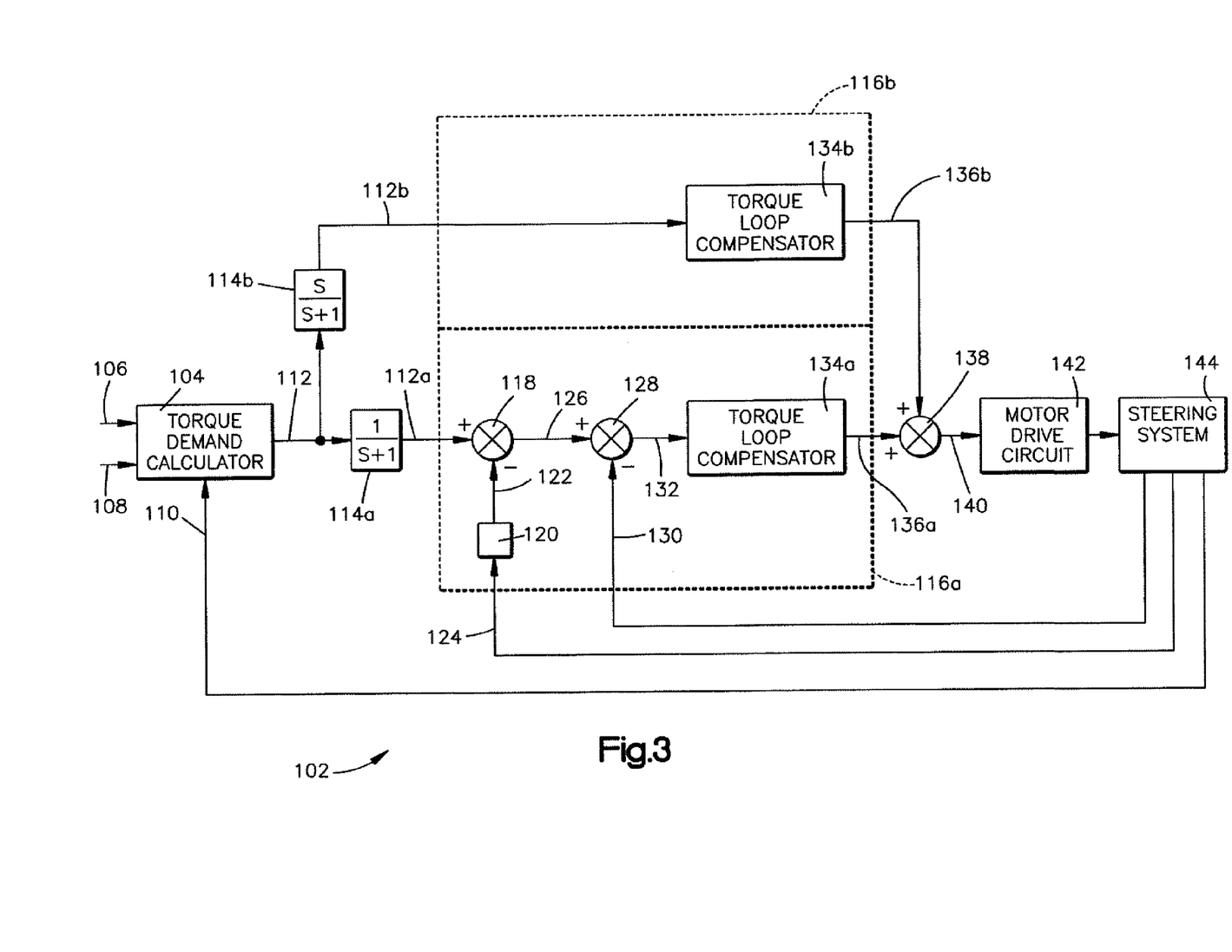
FIG. 3 is a process diagram of a control process for the apparatus of FIG. 1.

The controller 102 receives the signals generated by the lateral acceleration sensor 96, the hand wheel rotation sensor 98, and the vehicle speed sensor 100. Additionally, the controller 102 receives the column torque signal from the torque sensor 94. The controller 102 analyzes the respective signals and generates electric outputs for controlling the electric motor 88. FIG. 3 illustrates the control process of the controller 102. As shown schematically in FIG. 3, a portion of the controller 102, referred to as a torque demand calculator 104, receives the vehicle speed signal 106, the lateral acceleration signal 108, and the hand wheel rotation magnitude signal 110. The torque demand calculator 104 cooperates with the steering system, shown generally at 144 in FIG. 3, to provide a desired steering assist that results in a desired steering feel to the operator of the hand wheel 14. The torque demand calculator 104 follows an algorithm or a lookup table that is stored in a memory of the controller 102 to process the signals received. When the vehicle speed signal 106, the lateral acceleration signal 108, and the hand wheel rotation magnitude signal 110 are received by the controller 102, either the algorithm is run on a processor of the controller 102 or the lookup table is consulted to determine a desired operator torque 112 to be applied to the hand wheel 14 of the vehicle. The desired operator torque 112 corresponds to the amount of torque an operator of the vehicle is to exert on the hand wheel 14 to perform the desired steering maneuver.

Depending upon environmental conditions, e.g., road terrain such as potholes, ditches or bumps, the vehicle wheels 12 may be subjected to high amounts of vibration or movement during operation of the vehicle. Therefore, the sensors 106, 108, 110 may indicate that the wheels 12 are undergoing high levels of torque. Consequently, the operator of the vehicle may have to exert higher amounts of torque on the hand wheel 14 in order to perform the desired steering maneuver. This may occur, for example, in military environments in which all-terrain vehicles must navigate through rugged terrain that may be littered with potholes, craters, etc. that vehicles in normal highway or civilian use do not experience.

Due to the elevated torque and stress upon the vehicle wheels 12 under these conditions, the desired operator torque 112 may include both a low frequency operator torque component 112a and a high frequency operator torque component 112b. The low frequency torque component 112a is attributable to sensed vehicle conditions under normal driving conditions. In other words, the low frequency torque component 112a accounts for the initial, lower torque upon the vehicle wheels 12. When the vehicle experiences abnormal or harsh driving conditions that put added stress and torque upon the vehicle wheels 12 the high frequency torque component 112b accounts for the added torque.

Since low frequency torque and high frequency torque upon the vehicle wheels 12 affect steering in different ways, it may be desirable to separate or filter the high frequency torque from the low frequency torque when processing the desired operator torque 112. In order to separate the desired operator torque 112 into the low and high frequency components 112a, 112b the desired operator torque is input into a low-pass bandwidth filter 114a.

When the desired operator torque 112 enters the low-pass filter 114a, the low frequency torque component 112a is output to a low frequency control loop 116a and the high frequency torque component 112b is output to a high frequency control loop 116b. The transition or demarcation frequency of the low-pass filter 114a is within the bandwidth of the closed-loop torque compensated loop 116a. This ensures that the entire low frequency torque component 112a signal is accounted for and processed by the controller 102 in the low frequency control loop 116a. The remainder of the desired operator torque 112, i.e., the high frequency torque component 112b, can then be processed in the high frequency control loop 116b.

The low frequency control loop 116b has a closed configuration in that the loop continuously receives feedback from the steering system 144. In the low frequency control loop 116a, the low frequency torque component 112a is first input into a first summation block 118. Concurrently, inertia 120 of the hand wheel 14 of the vehicle is determined. One known method of determining the inertia 120 of the hand wheel 14 is by using parallel axis theorems. The inertia 120 of the hand wheel 14 is stored in the memory of the controller 102.

The inertia 120 of the hand wheel 14 is used to calculate a hand wheel torque 122. The hand wheel torque 122 is the torque that the operator of the vehicle must exert on the hand wheel 14 to overcome the inertia 120 of the hand wheel. As stated above, the acceleration of the hand wheel 14 is also determined. The hand wheel acceleration signal is indicated at 124 in FIG. 3. To calculate the hand wheel torque 122, the hand wheel acceleration signal 124 is multiplied by the inertia 120 of the hand wheel 14. The hand wheel torque 122 is also input into the first summation block 118.

In the first summation block 118, a value for the hand wheel torque 122 is subtracted from the low frequency torque component 112a. The output of the first summation block 118, indicated at 126 in FIG. 3, is input into a second summation block 128. The column torque signal, indicated at 130, from the torque sensor 94 is also input into the second summation block 128. In the second summation block 128, the column torque signal 130 is subtracted from the output 126 of the first summation block 118. The output of the second summation block 128 is an error signal, indicated at 132.

Since both the hand wheel torque 122 and the column torque 130 sensed across the torsion bar 50 are subtracted from the low frequency torque component 112a to produce the error signal 132, an equivalent process would be to add the hand wheel torque 122 to the column torque 130 in a first summation block to produce an actual operator torque necessary to perform the steering maneuver. The actual operator torque would then be subtracted from the desired operator low frequency torque component 112a in a second summation block to produce the error signal 132.

The error signal 132 is input into a portion of the controller 102 referred to as a torque loop compensator 134. The torque loop compensator 134 is a lead/lag compensator that receives the error signal 132 and, based upon the error signal, determines a first electrical power output, indicated at 136a, for the electric motor 88. The first electrical power output 136a of the torque loop compensator 134 is input to a third summation block 138. The first electrical power output 136a is used to help control the steering system 144 and, more specifically, the hydraulic motor 28 of the steering gear 16.

While the low frequency torque component 112a is processed in the low frequency control loop 116a, the high frequency torque component 112b passes through a high-pass bandwidth filter 114b and is processed in the high frequency control loop 116b. In contrast to the low frequency control loop 116a, which has the closed configuration that relies on feedback from the steering system 144, the high frequency control loop 116b has an open configuration that does not use feedback from the steering system. The high frequency torque component 112b is input directly into a torque loop compensator 134b in the high frequency control loop 116b. Similar to the torque loop compensator 134a of the low frequency control loop 116a, the torque loop compensator 134b is a lead/lag compensator that receives the high frequency torque component 112b and, based upon the high frequency torque component, determines a second electrical power output, indicated at 136b, for the electric motor 88. The second electrical power output 136b of the torque loop compensator 134b is input to the third summation block 138. In the third summation block 138, the value of the first electrical output 136a from the torque loop controller 134a of the low frequency control loop 116a is added to the value of the second electrical output 136b from the torque loop controller 134b of the high frequency control loop 116b. The output of the third summation block 138, indicated at 140, is connected to a motor drive circuit 142 of the controller 102. The motor drive circuit 142 regulates the electric power from the power source 90 to the electric motor 88 (see FIG. 1).

Referring to FIG. 1, when the electric motor 88 receives the combined electric power of the first and second electrical outputs 136a, 136b, the output shaft of the electric motor, through the gear assembly 92, rotates the input shaft 82. As a result, the electric motor 88 assists the operator in controlling the hydraulic motor 28 by adjusting the torque across the torsion bar 50. By using the electric motor 88 to help control the hydraulic motor 28, the apparatus 10 provides a desired steering assist and results in a desired steering feel to the operator.

The control process including the low frequency control loop 116a and the high frequency control loop 116b is repeated continuously during operation of the vehicle. As a result, the output 140 to the motor drive circuit 142 is updated continuously to reflect the changes in the vehicle conditions. Since the controller 102 filters the desired operator torque 112 into low frequency and high frequency torque components 112a, 112b for processing, the controller may accurately account for elevated torque and movement of the vehicle and vehicle wheels 12 during abnormal or harsh driving conditions. The controller 102 thereby advantageously provides improved steering assist and steering feel over a wide range of vehicle operating conditions.

Figure 4:
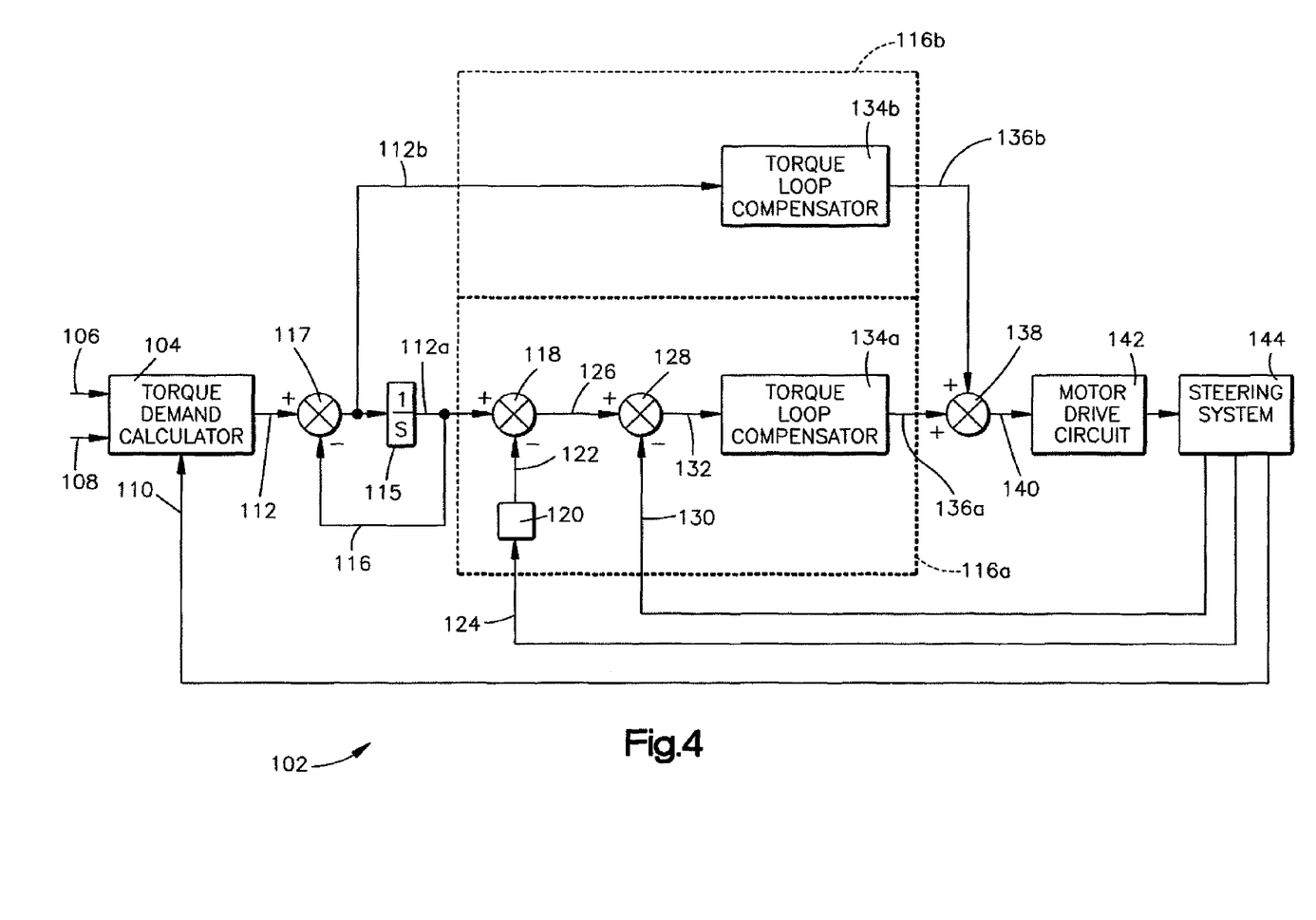
FIG. 4 is an alternative process diagram of a control process for the apparatus of FIG. 1.

In an alternative aspect of the present invention illustrated in FIG. 4, a single bandwidth filter 115 is used with a feedback loop 116 to direct the low frequency torque component 112a to the low frequency control loop 116a and to direct the high frequency torque component 112b to the high frequency control loop 116b. When the desired operator torque component 112 reaches the filter 115, the low frequency torque component 112a passes through the filter and into the low frequency control loop 116b. The low frequency torque component 112a is processed in the low frequency control loop 116a in the manner described to produce the first electrical power output 136a.

The low frequency torque component 112a also passes back through the feedback loop 116 to a summation block 117. In the summation block 117, the low frequency torque component 112a is subtracted from the continuously incoming desired operator torque component 112b. The output of the summation block 117 is therefore the high frequency torque component 112b. The high frequency torque component 112b cannot pass through the filter 115 and, thus, the high frequency torque component is input to the high frequency control loop 116b. The high frequency torque component 112b is processed in the high frequency control loop 116b in the manner described to produce the second electrical power output 136b. The first and second electrical output signals 136a, 136b are summed in the summation block 138 and used to operate the electric motor 88 to provide the desired steering assist and steering feel.

From the above description of the invention, those skilled in the art will perceive improvements, changes and modifications. Such improvements, changes and modifications within the skill of the art are intended to be covered by the appended claims.

Having described the invention, I claim the following:

1. A method for controlling a steering apparatus of a vehicle, the method comprising the steps of:
    (i) providing at least one signal indicative of a condition of the vehicle during a steering maneuver to a controller;
    (ii) analyzing the at least one vehicle condition signal to determine a desired operator torque to be applied to a hand wheel of the vehicle;
    (iii) filtering the desired operator torque into a low frequency torque component and a high frequency torque component; and
    (iv) controlling the steering apparatus based on the low frequency torque component and the high frequency torque component.

2. The method as defined in claim 1 wherein the step of controlling the steering apparatus comprises:
    producing a first electric power output based on the low frequency torque component;
    producing a second electric power output based on the high frequency torque component; and
    controlling the steering apparatus with the first and second electric power outputs.

3. The method as defined in claim 2 wherein the step of producing the first electric power output includes the steps of:
   determining inertia of the hand wheel of the vehicle;
   determining an acceleration of the hand wheel;
   calculating a hand wheel torque by multiplying the inertia of the hand wheel with the acceleration of the hand wheel;
   determining a column torque across a torsion bar;
   producing an error signal by subtracting the hand wheel torque and the column torque from the low frequency torque component; and
   determining the first electric power output based on the error signal.

4. The method as defined in claim 3 wherein the step of determining an acceleration of the hand wheel of the vehicle includes the steps of:
   monitoring a hand wheel rotation magnitude of the vehicle;
   differentiating the hand wheel rotation magnitude relative to time; and
   differentiating the hand wheel rotation magnitude relative to time for a second time.

5. The method as defined in claim 3 wherein the step of determining a column torque across a torsion bar includes the steps of:
   providing a torsion bar having known material properties;
   monitoring the rotation of a first end of the torsion bar relative to a second end of the torsion bar; and
   determining the column torque using the known properties and the relative rotation across the torsion bar.

6. The method as defined in claim 2 wherein the step of controlling the steering apparatus with the first and second electric power outputs includes the step of applying the first electric power output and the second electric power output to an electric motor to rotate an input shaft associated with a hydraulic motor.

7. The method as defined in claim 6 wherein the step of applying the first and second electric power outputs to the electric motor to rotate an input shaft associated with a hydraulic motor includes the steps of:
   connecting an output of the electric motor to a gear assembly;
   connecting the gear assembly to the input shaft; and
   rotating the output of the electric motor to affect rotation of the input shaft.

8. The method as defined in claim 2 wherein the step of producing the second electric power output based on the high frequency torque component comprises producing the second electric power output in an open control loop.

9. The method as defined in claim 1 further including the step of continuously repeating the method during operation of the vehicle.

10. The method as defined in claim 1 wherein the step of analyzing the at least one vehicle condition signal to determine a desired operator torque to be applied to a hand wheel of the vehicle includes the steps of:
    storing in a memory of the controller a lookup table comprising data correlating the at least one vehicle condition signal to a desired operator torque; and
    consulting the lookup table with the at least one vehicle condition signal to determine the desired operator torque.

11. The method as defined in claim 1 wherein the step of providing at least one signal indicative of a condition of the vehicle includes the steps of:
    monitoring at least one of a speed of the vehicle, a lateral acceleration of the vehicle, and a hand wheel rotation magnitude of the vehicle; and
    generating a signal indicative of the condition monitored.

12. The method as defined in claim 1 wherein the step of analyzing the at least one vehicle condition signal comprises analyzing a plurality of vehicle condition signals to determine a desired operator torque to be applied to the hand wheel of the vehicle.

13. A method for controlling a steering apparatus of a vehicle, the method comprising the steps of:
    (i) providing at least one signal indicative of a condition of the vehicle during a steering maneuver to a controller;
    (ii) analyzing the at least one vehicle condition signal to determine a desired operator torque to be applied to a hand wheel of the vehicle;
    (iii) filtering the desired operator torque into a low frequency torque component and a high frequency torque component;
    (iv) determining inertia of the hand wheel of the vehicle;
    (v) determining an acceleration of the hand wheel;
    (vi) calculating a hand wheel torque by multiplying the inertia of the hand wheel with the acceleration of the hand wheel;
    (vii) determining a column torque across a torsion bar;
    (viii) producing an error signal by subtracting the hand wheel torque and the column torque from the low frequency torque component;
    (ix) producing a first electric power output based on the error signal;
    (x) producing a second electric power output based on the high frequency torque component; and
    (xi) controlling the steering apparatus with the first electric power output and the second electric power output.

14. The method as defined in claim 13 wherein the step of providing at least one signal indicative of a condition of the vehicle includes the steps of:
    monitoring at least one of a speed of the vehicle, a lateral acceleration of the vehicle, and a hand wheel rotation magnitude of the vehicle; and
    generating a signal indicative of the condition monitored.

15. The method as defined in claim 13 wherein the step of determining an acceleration of the hand wheel of the vehicle includes the steps of:
    monitoring a hand wheel rotation magnitude of the vehicle;
    differentiating the hand wheel rotation magnitude relative to time; and
    differentiating the hand wheel rotation magnitude relative to time for a second time.

16. The method as defined in claim 13 wherein the step of controlling the steering apparatus with the first and second electric power outputs includes the step of applying the first and second electric power outputs to an electric motor to rotate an input shaft associated with a hydraulic motor.

17. The method as defined in claim 16 wherein the step of applying the first and second electric power outputs to the electric motor to rotate an input shaft associated with a hydraulic motor includes the steps of:
    connecting an output of the electric motor to a gear assembly;
    connecting the gear assembly to the input shaft; and
    rotating the output of the electric motor to affect rotation of the input shaft.

18. The method as defined in claim 13 wherein the step of determining a column torque across a torsion bar includes the steps of:
    providing a torsion bar having known material properties;
    monitoring the rotation of a first end of the torsion bar relative to a second end of the torsion bar; and determining the column torque using the known properties and the relative rotation across the torsion bar.

19. The method as defined in claim 13 wherein the step of analyzing the at least one vehicle condition signal to determine a desired operator torque to be applied to a hand wheel of the vehicle includes the steps of:
   storing in a memory of the controller a lookup table comprising data correlating the at least one vehicle condition signal to a desired operator torque; and
   consulting the lookup table with the at least one vehicle condition signal to determine the desired operator torque.

20. The method as defined in claim 13 further including the step of continuously repeating the method during operation of the vehicle.

21. The method as defined in claim 13 wherein the step of producing the second electric power output based on the high frequency torque component comprises producing the second electric power output in an open control loop.

* * * * *